(12) United States Patent
Shimada

(10) Patent No.: US 10,002,730 B2
(45) Date of Patent: Jun. 19, 2018

(54) INHIBITER SWITCH

(71) Applicant: Valeo Japan Co., Ltd., Saitama (JP)

(72) Inventor: Hiroyuki Shimada, Tokyo (JP)

(73) Assignee: Valeo Japan Co., Ltd. (JP)

( * ) Notice: Subject to any disclaimer, the term of this patent is extended or adjusted under 35 U.S.C. 154(b) by 78 days.

(21) Appl. No.: 15/283,256

(22) Filed: Sep. 30, 2016

(65) Prior Publication Data
US 2017/0098516 A1   Apr. 6, 2017

(30) Foreign Application Priority Data

Oct. 1, 2015   (JP) .................... 2015-196295

(51) Int. Cl.
| | | |
|---|---|---|
| *H01H 9/06* | (2006.01) | |
| *H01H 19/03* | (2006.01) | |
| *B60R 16/00* | (2006.01) | |
| *H01H 21/34* | (2006.01) | |
| *H01H 19/58* | (2006.01) | |

(52) U.S. Cl.
CPC ........... *H01H 19/03* (2013.01); *B60R 16/005* (2013.01); *H01H 19/585* (2013.01); *H01H 21/34* (2013.01); *H01H 2300/02* (2013.01)

(58) Field of Classification Search
CPC ........ H01H 19/00; H01H 19/20; H01H 19/02; H01H 19/10; H01H 19/14; H01H 19/28; H01H 19/08; H01H 19/58; H01H 19/18; H01H 21/00; H01H 21/28; H01H 3/00; H01H 3/06; H01H 3/16; H01H 3/18; H01H 1/12; H01H 1/00; F16H 59/105
USPC .............. 200/6 R, 11 A, 571, 47, 302.1, 344
See application file for complete search history.

(56) References Cited

U.S. PATENT DOCUMENTS

| | | | |
|---|---|---|---|
| 7,956,298 B2* | 6/2011 | Shimada | ............... F16H 59/105 200/11 A |
| 7,956,299 B2* | 6/2011 | Shimada | ............... F16H 59/105 200/11 A |
| 2009/0065332 A1 | 3/2009 | Shimada et al. | |
| 2015/0027865 A1* | 1/2015 | Inotsuka | ............... F16H 59/105 200/61.88 |

FOREIGN PATENT DOCUMENTS

JP          2009-063103 A          3/2009

\* cited by examiner

*Primary Examiner* — Anthony R. Jimenez
(74) *Attorney, Agent, or Firm* — Fishman Stewart PLLC

(57) ABSTRACT

In an inhibiter switch, a detent plate may be rotated on one side around a rotational shaft to be assembled in a pole board, and a stopper may be provided in the pole board to define a rotation range of the detent plate on the one side. An interference portion may be provided on a movement track of a movable contact piece when the detent plate rotates around the rotational shaft, wherein the interference portion may interfere with the movable contact piece to become resistance to rotation of the detent plate to the other side around the rotational shaft.

20 Claims, 6 Drawing Sheets

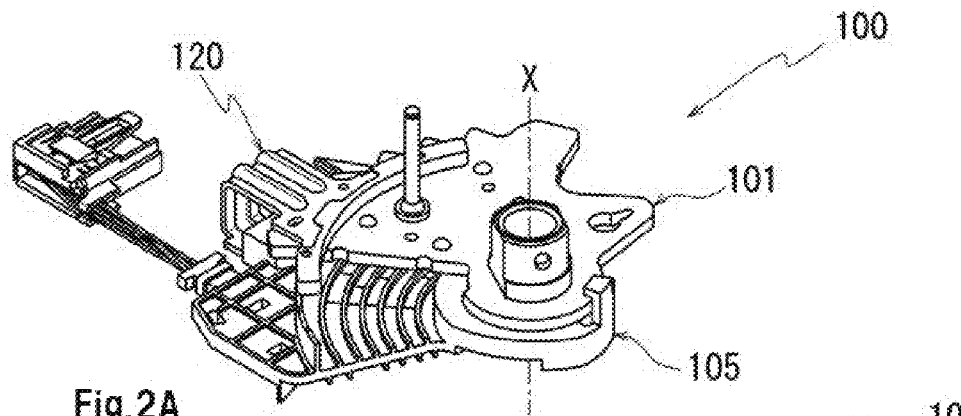
Fig.2A
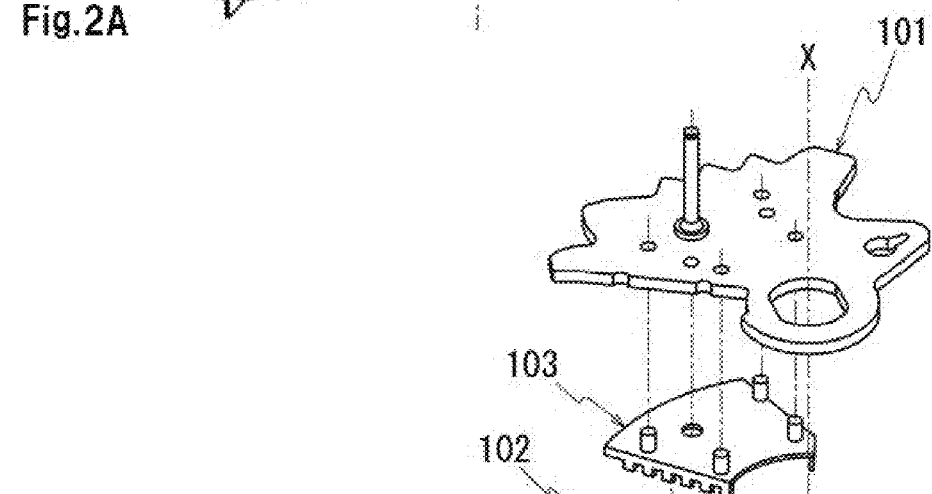
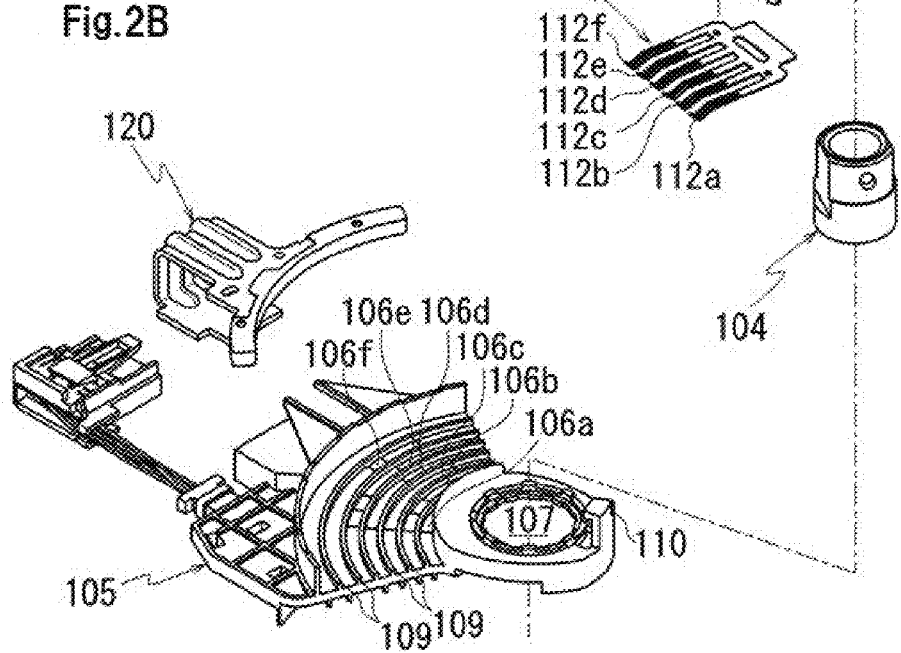
Fig.2B

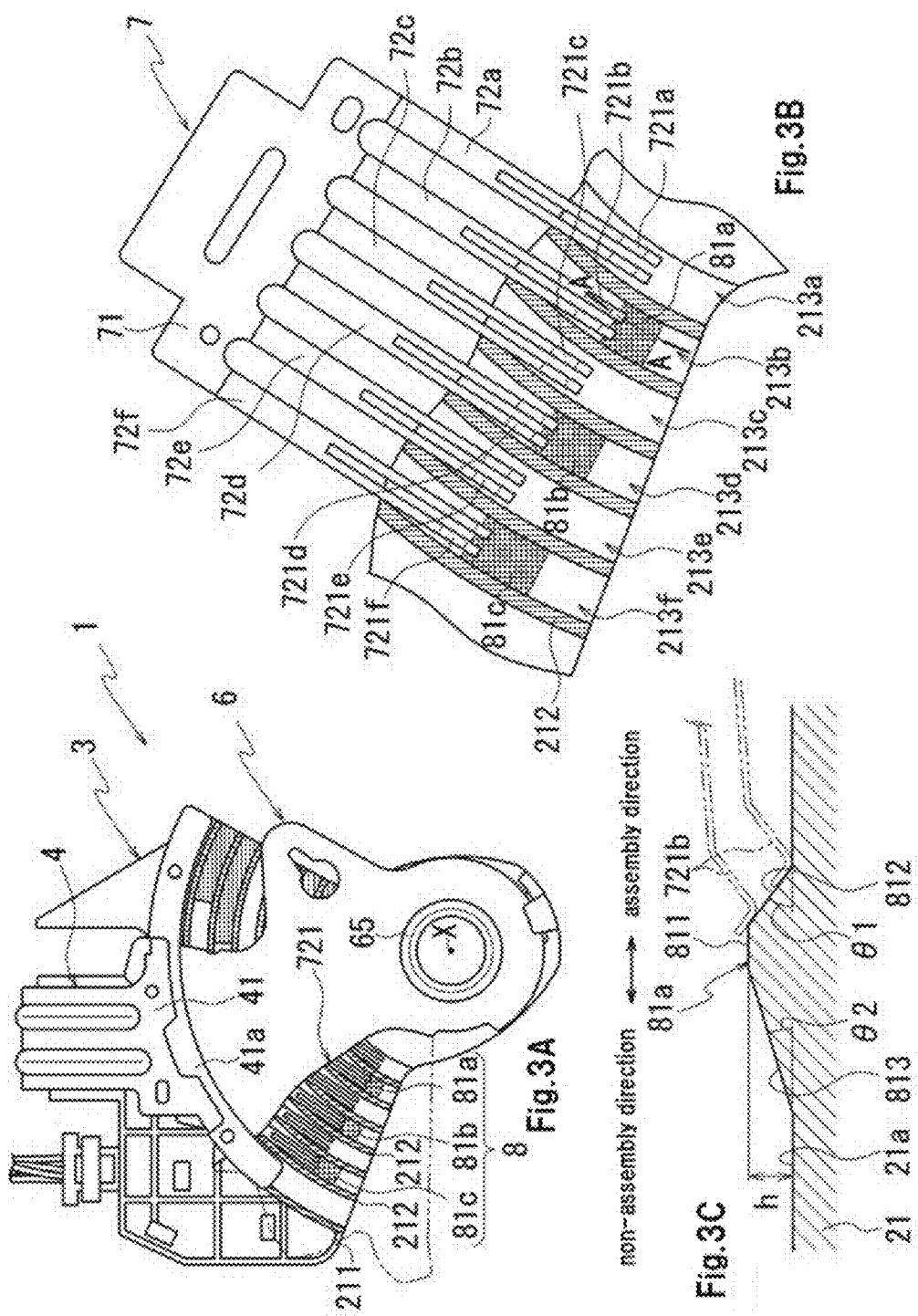

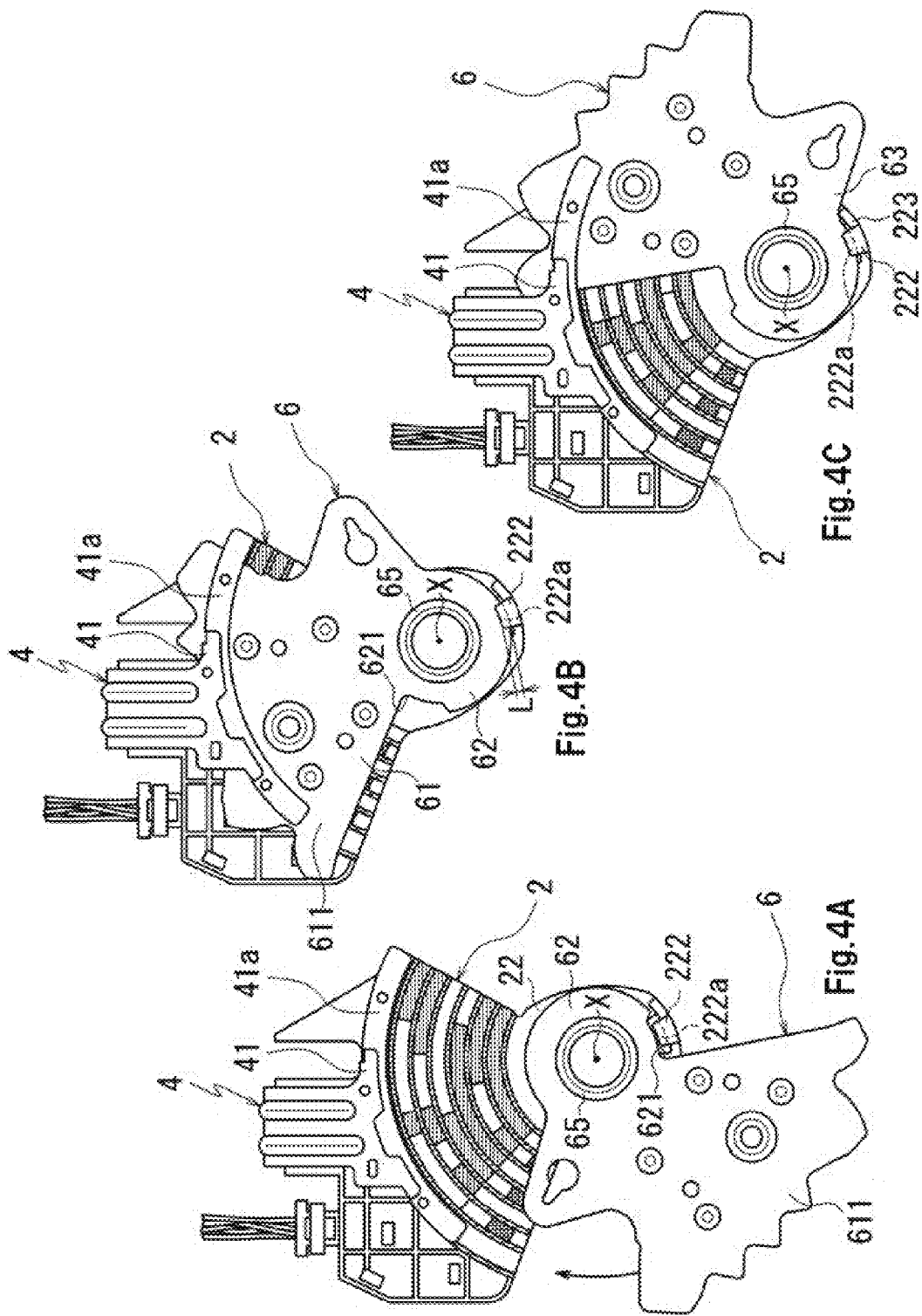

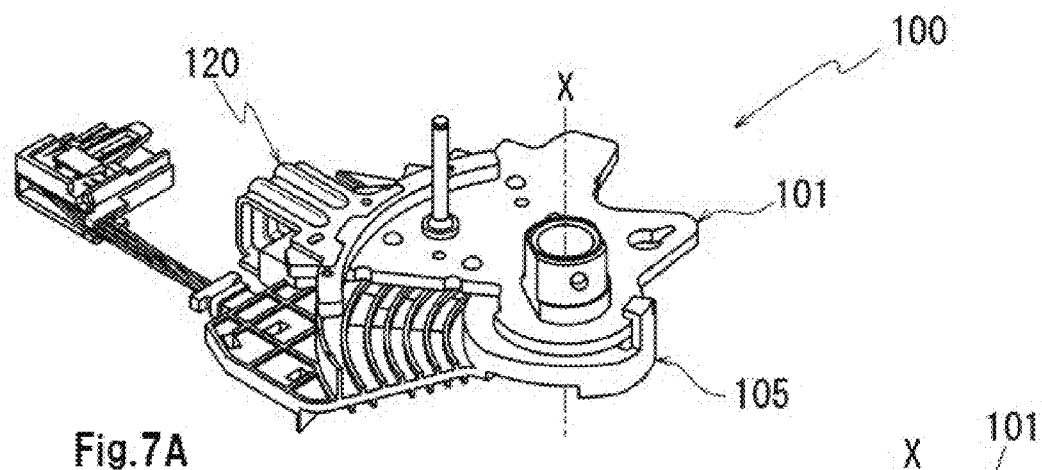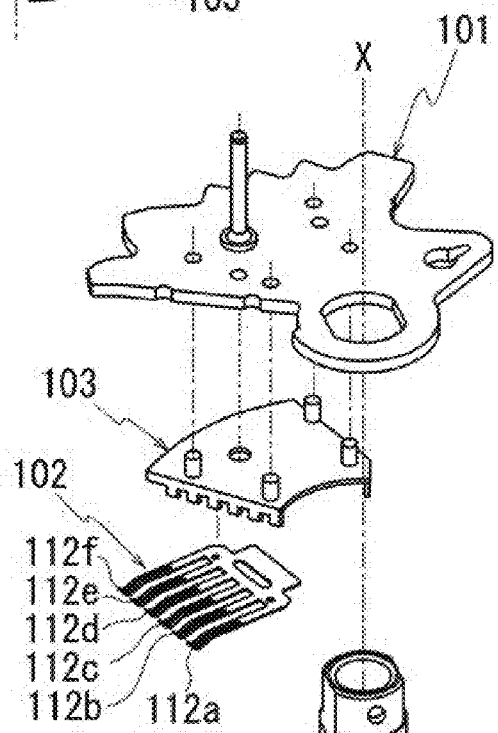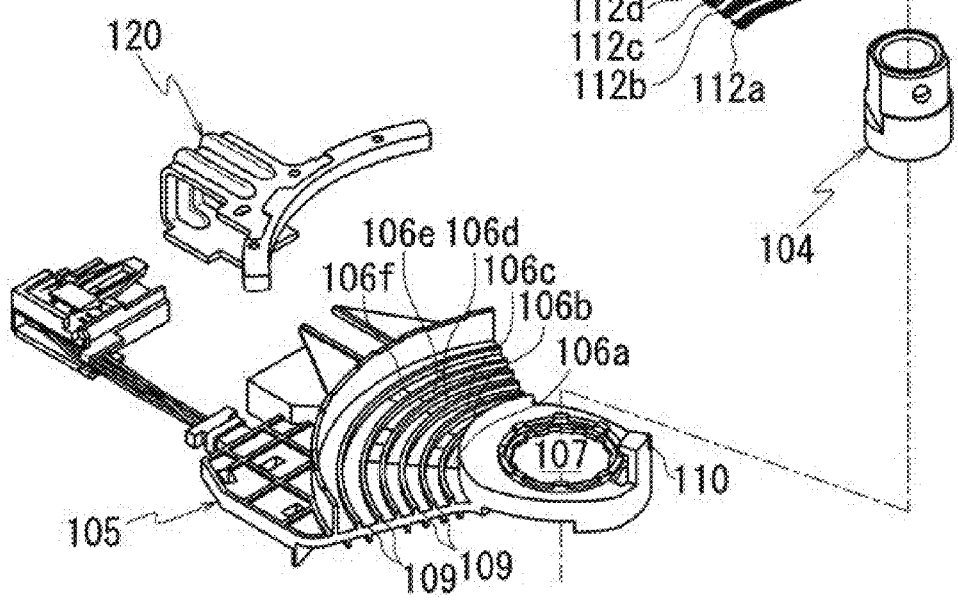
Fig.7A
Fig.7B

INHIBITER SWITCH

CROSS-REFERENCE TO RELATED APPLICATION

This application claims priority under 35 USC 119 from Japanese Patent Application No. 196295/2015 filed on Oct. 1, 2015, the disclosure of which is incorporated by reference herein.

TECHNICAL FIELD

The present invention relates to an inhibiter switch.

BACKGROUND

Japanese Patent Laid-Open No. 2009-63103 discloses an inhibiter switch that detects a selection range of a shift lever for a vehicle.

FIG. 7A and FIG. 7B are diagrams explaining a general configuration of an inhibiter switch according to a conventional example.

An inhibiter switch 100 has a detent plate 101 that rotates about a rotational axis X in association with a change of a selection range of a shift lever for a vehicle, and a movable contact point 102 with a plurality of contact point portions 112 (112a to 112f) arranged in parallel with each other is fixed on an opposing surface of the detent plate 101 to a pole board 105 through a support platform 103.

A fixed contact point 106 comprises a plurality of fixed contact points (106a to 106f), which are each formed in an arc shape as viewed in a direction of the rotational axis X and are disposed by predetermined intervals in a radial direction of the rotational axis X, on an opposing surface of the pole board 105 to the detent plate 101.

A region of each of the fixed contact points 106 (106a to 106f) exposed on an upper surface of the pole board 105 differs depending upon the peripheral direction around the rotational axis X. When the detent plate 101 rotates around the rotational axis X in association with an operation of the shift lever, the fixed contact point 106 (106a to 106f) connected electrically to the movable contact point 102 switches corresponding to an angular position of the detent plate 101 around the rotational axis X, so that a different output signal is output from the inhibiter switch 100.

Here, an assembly of the inhibiter switch 100 will be performed through the following steps (1) and (2).

(1) Step where the detent plate 101 on which the movable contact point 102 is fixed and the pole board 105 equipped with a support member 120 are prepared, and a cylindrical connecting member 104 connected to the detent plate 101 is inserted in a support hole 107 of the pole board 105 to assemble the detent plate 101 and pole board 105 in the direction of the rotational axis X.

(2) Step where the detent plate 101 is rotated around the rotational axis X to insert the detent plate 101 between the support member 120 and the pole board 105, and the contact point portions 112 (112a to 112f) of the movable contact point 102 are inserted between partition walls 109 partitioning the fixed contact points 106 (106a to 106f) adjacent in a radial direction of the pole board 105.

Here, in the conventional inhibiter switch 100, the rotation in the direction of assembling the detent plate 101 to the pole board 105 is restricted in the angular position of abutting on a stopper 110 provided in the pole board 105. On the other hand, the rotation in the direction of removing the detent plate 101 from the pole board 105 is not restricted.

This is because if the restricting means of defining a rotation-possible range in the removal direction is provided, since the rotation in the direction of assembling the detent plate 101 to the pole board 105 is blocked upon assembling the detent plate 101 to the pole board 105, it becomes impossible to assemble the detent plate 101 to the pole board 105.

Here, there are some cases where upon transporting the assembled inhibiter switch 100, vibrations at the transporting cause the detent plate 101 to rotate in the direction of being removed from the pole board 105 and being out of the pole board 105. In this case, the contact point portions 112 (112a to 112f) of the movable contact point 112 mounted on the detent plate 101 and the like are possibly damaged.

Therefore, it is required for the detent plate to be not easily disconnected from the pole board in the inhibiter switch after assembly completion of the detent plate.

SUMMARY

Accordingly, the present invention is made in view of the above-described problems, and an object of the present invention is to provide an inhibiter switch which can appropriately prevent a detent plate from being easily disconnected from a pole board in the inhibiter switch after assembly completion of the detent plate.

According to the present invention, an inhibiter switch comprises:

a pole board on a surface of which a fixed contact point is provided;

a detent plate that is rotatably supported on the pole board;

a movable contact point that is provided on an opposing part of the detent plate to the surface and includes a contact piece with the fixed contact point;

a retaining member that makes contact with the detent plate assembled in the pole board to allow rotation of the detent plate around a rotational shaft and restrict movement of the detent plate in a direction of the rotational shaft, and retains the detent plate in a state where the contact piece is elastically engaged to the fixed contact point, the detent plate being rotated in one side around the rotational shaft to be assembled in the pole board; and a stopper that is provided in the pole board to define a rotation range of the detent plate in the one side, wherein an interference portion is provided on a movement track of the contact piece when the detent plate rotates around the rotational shaft, the interference portion interfering with the movable contact piece to become resistance to the rotation of the detent plate to the other side around the rotational shaft.

According to the present invention, when the detent plate rotates to the other side around the rotational axis that is the direction of removing the detent plate from the pole board, the interference portion provided in the pole board interferences with the contact piece of the movable contact point provided in the detent plate to become the resistance to the rotation of the detent plate in the direction of being removed from the pole board.

Therefore, when rotational torque greater than the resistance acting from the interference portion does not act on the detent plate, the detent plate rotates to the other side around the rotational axis, and is not disconnected from the pole board.

Accordingly, it is possible to prevent the detent plate from being easily disconnected from the pole board in the inhibiter switch after the assembly completion of the detent plate.

Further, since the interference portion does not restrict the rotation of the detent plate around the rotational axis, the interference portion cannot remarkably block an operation of assembling the detent plate to the pole board by an operator and an operation of removing the detent plate assembled by the operator from the pole board.

BRIEF DESCRIPTION OF THE DRAWINGS

Other objects, features, and advantages of the present invention will become more apparent from the following detailed description made with reference to the accompanying drawings, in which like parts are designated by like reference numbers and in which:

FIG. 2A is a plan view illustrating a pole board in the inhibiter switch according to the embodiment;

FIG. 2B is a cross section taken in line A-A in FIG. 2A;

FIGS. 3A to 3C are diagrams explaining an interference portion in the inhibiter switch according to the embodiment;

FIGS. 4A to 4C are diagrams explaining an assembly of the inhibiter switch according to the embodiment;

FIGS. 7A and 7B are diagrams explaining a general configuration of an inhibiter switch according to a conventional example.

DETAILED DESCRIPTION

Hereinafter, an inhibiter switch according to an embodiment in the present invention will be in detail with reference to the accompanying drawings.

Figure 1:
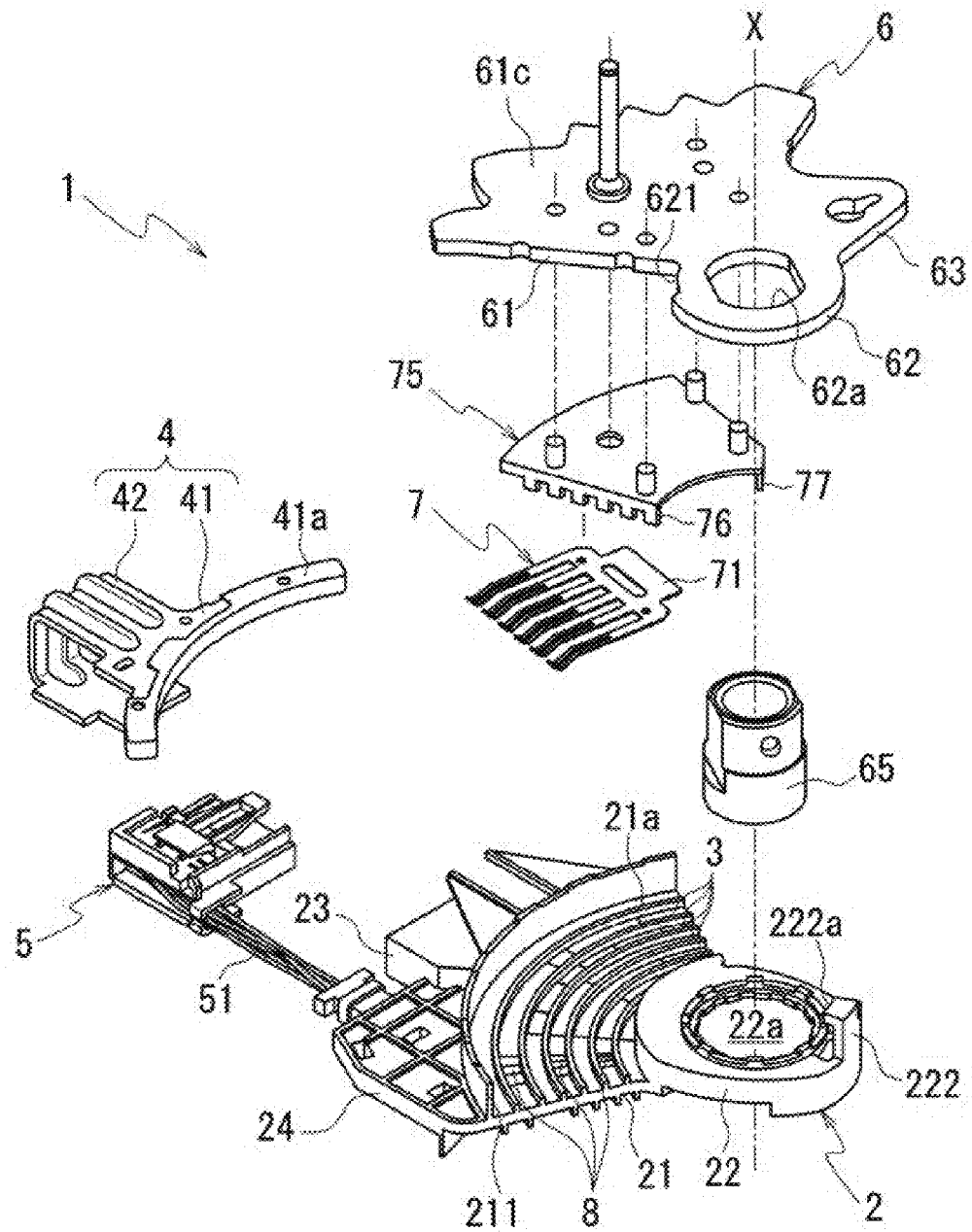
FIG. 1 is an exploded perspective view illustrating an inhibiter switch according to an embodiment of the present invention.

FIG. 1 is an exploded perspective view illustrating an inhibiter switch 1 according to an embodiment of the present invention. FIGS. 2A and 2B are diagrams explaining a pole board 2 in the inhibiter switch 1 according to the embodiment, wherein FIG. 2A is a plan view illustrating the pole board 2, and FIG. 2B is a cross section taken in line A-A in FIG. 2A.

FIGS. 3A to 3C are diagrams explaining an interference portion 8 (swollen portions 81) in the inhibiter switch 1 according to the embodiment, wherein FIG. 3A is a diagram illustrating a state where abutting portions 721 (721a to 721f) of a movable contact point 7 supported by a detent plate 6 are positioned on the swollen portions 81 (81a to 81c) on the pole board 2-side with a part of the detent plate being cut away, FIG. 3B is a diagram explaining the movable contact point 7 causing the abutting portions 721 (721a to 721f) to abut on the swollen portions 81 (81a to 81C), and FIG. 3C is a cross section taken in line A-A in FIG. 3B explaining a shape of the swollen portions 81.

In FIGS. 2A and 2B and FIGS. 3A to 3C, for easy understanding of positions of primary components in the pole board 2, a peripheral wall 211 and partition walls 212 are illustrated by hatching, and regions of fixed contact points 3 (3a to 3f) exposed on a surface of the pole board 2 are illustrated by hatching. This will be applied similarly to FIGS. 4A to 4C to be described later.

The inhibiter switch 1 is installed in a transmission case of an automatic transmission for a vehicle to output a signal corresponding to a selection range of a shift lever to a control device of the automatic transmission and the like.

The inhibiter switch 1 has the pole board 2 on a surface of which the fixed contact points 3 (3a to 3f) are provided, and a detent plate 6 in which the movable contact point 7 is fixed on an opposing surface to the pole board 2.

The detent plate 6 rotates around a rotational axis X in association with an operation of the shift lever (unillustrated). When the detent plate 6 rotates around the rotational axis X, contact positions between the movable contact point 7 and the fixed contact points 3 (3a to 3f) change to output a signal corresponding to the selection range of the shift lever.

As illustrated in FIG. 2A and FIG. 2B, the pole board 2 is provided with a connecting part 22 having an insert hole 22a in a position corresponding to a fan top of a base portion 21 formed in a fan shape in planar view, and the insert hole 22a in the connecting portion 22 is provided to penetrate the connecting portion 22 in the thickness direction of the pole board 2.

A cylindrical connecting member 65 (refer to FIG. 1) is inserted in the insert hole 22a to connect a manual shaft (unillustrated) and the detent plate 6 in such a manner as to be incapable of rotating relative to each other, and the connecting member 65 is supported to be rotatable around a center axis (rotational axis X) of the insert hole 22a in the connecting portion 22.

In this state, the detent plate 6 is provided to be spaced from the pole board 2 in an axial direction of the rotational axis X. When the manual shaft (unillustrated) is rotated by an operation of the shift lever (unillustrated), the detent plate 6 and the pole board 2 rotate relative to each other around the rotational axis X.

An outer peripheral part corresponding to a fan end of the fan-shaped base portion 21 is provided with a peripheral wall 211, and the peripheral wall 211 is formed in an arc shape along the peripheral direction around the rotational axis X in planar view.

A support portion 23 supporting an after-mentioned support member 4 is provided outside of the peripheral wall 211 in a radial direction of the rotational axis X, and a connector connecting portion 24 for connecting wires 51 extending from a connector 5 (refer to FIG. 1) with harness and the fixed contact points 3 (3a to 3f) insert-molded in the pole board 2 is provided outside of the peripheral wall 211.

The support portion 23 and the connector connecting portion 24 are provided to extend to a radial outside of the rotational axis X from an outer periphery of the peripheral wall 211, and are arranged adjacent to each other in a peripheral direction around the rotational axis X. In the embodiment the base portion 21, the connecting portion 22, the support portion 23 and the connector connecting portion 24 are formed integrally by plastic molding, which constitutes the pole board 2.

The plurality of fixed contact points 3 (3a to 3f) formed in the arc shape in planar view are provided on the base portion 21 in the rotational axis X-side from the peripheral wall 211. The fixed contact points 3 (3a to 3f) are arranged in the radial direction of the rotational axis X by predetermined intervals.

It should be noted that in a case where the fixed contact points 3a to 3f are described without being distinguished in the following explanation, the fixed contact point 3 is simply used for the description.

The fixed contact point 3a positioned in the innermost diameter side (rotational axis X-side) in the radial direction of the rotational axis X is the shortest in length in the peripheral direction around the rotational axis X, and the fixed contact point 3f positioned in the outermost diameter side is the longest in length in the peripheral direction around the rotational axis X. The fixed contact points 3b to 3e positioned between the fixed contact point 3a and the fixed contact point 3f are longer in the length in the peripheral direction around the rotational axis X in order of the fixed contact point 3b, the fixed contact point 3c, the fixed contact point 3d and the fixed contact point 3e.

The partition wall 212 formed in the arc shape in planar view is provided between the fixed contact points 3 adjacent to each other in the radial direction of the rotational axis X, and the fixed contact point 3a of the fixed contact points 3 (3a to 3f) is positioned in a groove 213a between the partition wall 212 and an outer periphery 22b of the connecting portion 22, and the fixed contact points 3b to 3f are respectively positioned in grooves 213b to 213f formed between the partition walls 212.

The fixed contact point 3a is exposed to a surface 21a of the base portion 21 in an entire region (refer to a region "a" hatched in the drawing) over an entire length in the peripheral direction of the rotational axis X, and the rest of the fixed contact points 3b to 3f are respectively exposed to the surface 21a of the base portion 21 only in a part of regions (refer to regions "b" to "e" hatched in the drawing) in the peripheral direction of the rotational axis X.

One ends of the fixed contact points 3a to 3f in the longitudinal direction are aligned on a line segment Lm passing the rotational axis X in planar view, and regions in the right side from the line segment Lm (one side edge 21b-side of the base portion 21) in FIG. 2A are regions on which abutting portions 721 (721a to 721f) of the movable contact point 7 (refer to FIG. 3) slide at the time of detecting a selection range of the shift lever by the inhibiter switch 1.

As illustrated in FIGS. 3A to 3C, the movable contact point 7 paired to the fixed contact points 3 is provided with a plurality of movable contact pieces 72 (72a to 72f) extending in the same direction from one side of a plate-shaped base portion 71 by predetermined intervals.

The movable contact pieces 72 (72a to 72f) are respectively supported by the base portion 71 in a cantilever manner, and abutting portions 721 (721a to 721f) of the movable contact pieces 72 (72a to 72f) in the distal side are positioned in the pole board 2-side from the base portion 71 in the axial direction of the rotational axis X, and are elastically displaceable in the axial direction of the rotational axis X.

It should be noted that in a case where the movable contact pieces 72 (72a to 72f) and the abutting portions 721 (721a to 721f) are described without being distinguished in the following explanation, they are simply described as the movable contact piece 72 and the abutting portion 721.

As illustrated in FIG. 1, the movable contact point 7 is fixed on the opposing surface of the detent plate 6 to the pole board 2 through a support platform 75 supporting the base portion 71 of the movable contact point 7.

The support platform 75 is provided with extension walls 76, 77 extending to the pole board 20-side from both side portions of the support platform 75, and the movable contact point 7 is positioned between the extension walls 76, 77 in the support platform 75.

As illustrated in FIGS. 3A to 3C, in the inhibiter switch 1, the abutting portions 721 (721a to 721f) of the movable contact pieces 72 (72a to 72f) are respectively inserted in the grooves 213 (231a to 213f) accommodating the fixed contact points 3a1 to 3f in the base portion 21, and the abutting portions 721 (721a to 721f) elastically make pressure-contact with a resin covering a surface of the associated fixed contact points 3a to 3f or fixed contact point 3b to 3f (opposing surface to the detent plate 6).

Therefore, when the detent plate 6 rotates around the rotational axis X in association with an operation of the shift lever (unillustrated), the movable contact point 7 fixed on the detent plate 6 is displaced in the peripheral direction around the rotational axis X to displace positions on which the abutting portions 721 (721a to 721f) abut.

Thereby, a combination of the fixed contact points 3 (3a to 3f) to which the movable contact point 7 is electrically connected is switched in response to an angular position of the detent plate 6 around the rotational axis X. Therefore, in the inhibiter switch 1 an different output signal depending upon the fixed contact points 3 (3a to 3f) to which the movable contact point 7 is electrically connected is output to an external device connected to the connector 5.

Here, the abutting portions 721 (721a to 721f) of the movable contact point 7 elastically makes pressure-contact with the base portion 21-side, and reaction acting on the movable contact point 7 from the base portion 21 is input to the detent plate 6 retaining the movable contact point 7.

Therefore, an urgent force acts on the detent plate 6 to move the detent plate 6 in a direction of being away from the pole board 2.

Here, when the detent plate 6 moves in the direction of being away from the pole board 2 with the reaction acting from the pole board 2-side, the movable contact point 7 is away from the base portion 21 of the pole board 2, so that the movable contact point 7 and fixed contact point 3 cannot make contact with each other electrically.

Therefore the support member 4 is fixed on the support portion 23 attached to the base portion 21, and the detent plate 6 is retained in a position of causing the abutting portions 721 (721a to 721f) of the movable contact point 7 to elastically make contact with the fixed contact points 3 in a state where the detent plate 6 is restricted from moving to the direction of the rotational axis X by the support member 4 and is rotatable around the rotational axis X.

The support member 4 has an abutting portion 41 of the detent plate 6 and a retaining arm 42 portion positioning the abutting portion 41 to the rotational axis X-side from the peripheral wall 211 of the pole board 2.

In planar view the abutting portion 41 is formed in an arc shape along the peripheral wall 211, thereby making it possible to make contact with an opposite surface 61c of the plate-shaped base portion 61 in the detent plate 6 to the pole board 2 over a predetermined range in the peripheral direction around the rotational axis X (refer to FIG. 1).

An elastic member 41a is attached in a contact region of the abutting portion 41 with the detent plate 6 to reduce a sliding resistance upon rotation of the detent plate 6 around the rotational axis X.

The retaining arm portion 42 of the support member 4 is press-fitted in the support portion 23 of the pole board 2 from the radial direction of the rotational axis X to be firmly fixed by the pole board 2, and can retain the abutting portion 41 on the detent plate 6 in a predetermined position spaced from the surface 21a of the base portion 21 in the pole board 2.

An assembly of the inhibiter switch 1 having the above configuration will be explained.

FIGS. 4A to 4C are diagrams explaining the assembly of the inhibiter switch 1, wherein FIG. 4A is a diagram illustrating a state where the detent plate 6 is arranged in an assembly start position to the pole board 2, FIG. 4B is a diagram illustrating a state where the detent plate 6 is rotated from the state of FIG. 4A to a clockwise direction around the rotational axis X to be assembled to the pole board 2, and FIG. 4C is a diagram illustrating a state where the detent plate 6 is further rotated from the state of FIG. 4B to the clockwise direction around the rotational axis X to cause a rotation restricting portion 63 of the detent plate 6 to abut on a stopper 223 in the pole board 2-side.

It should be noted that in the inhibiter switch 1, a rotation range of the detent plate 6 in a state of being assembled in the automatic transmission is set. FIG. 4B illustrates a state where the detent plate 6 is positioned in a boundary of the rotation range in a case where the detent plate 6 rotates in a counterclockwise direction in the drawing (hereinafter, described as a boundary of a non-assembly direction as well), and FIG. 4C illustrates a state where the detent plate 6 is positioned in a boundary of the rotation range in a case where the detent plate 6 rotates in a clockwise direction in the drawing (hereinafter, described as a boundary of an assembly direction as well).

As illustrated in FIGS. 2A and 2B, a projection portion 222 that is an index of the assembly start position of the detent plate 6 and the stopper 223 restricting the boundary of the assembly direction of the detent plate 6 are provided on the outer peripheral portion of the connecting portion 22 in the pole board 2 to project to the detent plate 6-side.

An engagement projection 222a projecting to the insert hole 22a-side is provided on the distal end of the projection portion 222. As viewed in the direction of the rotational axis X, a projection length L of the engagement projection 222a is set to a length of overlapping a ring-shaped engagement portion 62 of the detent plate 6 in a state where the assembly of the detent plate 6 to the pole board 2 is completed (refer to FIG. 4B).

The engagement portion 62 of the detent plate 6 is provided with a concave portion 621 recessed to the connecting member 65 (insert hole 62a)-side in a boundary portion to the base portion 61, and the concave portion 621 is, as viewed in the direction of the rotational axis X, provided in a position of being aligned to the engagement projection 222a upon arranging the detent plate 6 in the assembly start position to the pole board 2 (refer to FIG. 4A).

Therefore when the detent plate 6 is moved in a direction of being closer to the pole board 2 (in the drawing, axial direction of the rotational axis X) after arranging the detent plate 6 in the assembly start position, the connecting member 65 of the detent plate 6 can be inserted in the insert hole 22a in the pole board 2-side until a position where the engagement portion 62 of the detent plate 6 abuts on the connecting portion 22 of the pole board 2 (refer to FIG. 2A).

In this state, by rotating the detent plate 6 in the clockwise direction around the rotational axis X and inserting an outer peripheral portion 611 of the detent plate 6 under the abutting portion 41 of the support member 4 in the pole board 2-side, the detent plate 6 is assembled in the pole board 2 in a state where the outer peripheral portion 611 and the engagement portion 62 of the detent plate 6 are restricted from moving in the direction of the rotational axis X by the abutting portion 41 of the support member 4 in the pole board 2-side and the engagement projection 222a of the connecting portion 22.

Here, the detent plate 6 can rotate in the clockwise direction around the rotational axis X until a position where the rotation restricting portion 63 of the detent plate 6 abuts on the stopper 223 in the pole board 2-side.

It should be noted that in the conventional inhibiter switch assembled by rotating the detent plate arranged in the assembly start position around the rotational axis X to be assembled in the pole board, the rotation of the detent plate in the non-assembly direction is not restricted for preventing the detent plate from being incapable of being assembled.

Therefore there are some cases where in the conventional inhibiter switch, when the inhibiter switch before being mounted in the transmission case is subjected to vibrations caused by transportation or the like, the detent plate is rotated in the non-assembly direction due to the vibration and falls down from the pole board.

In the inhibiter switch 1 according to the embodiment, for preventing the detent plate 6 from easily falling down from the pole board 2 of the inhibiter switch 1 after the assembly, the interference portion 8 (refer to FIGS. 2A and 2B) providing resistance to the rotation of the detent plate 6 in the non-assembly direction is provided on the surface of the base portion 21 of the pole board 2.

Figure 5A:
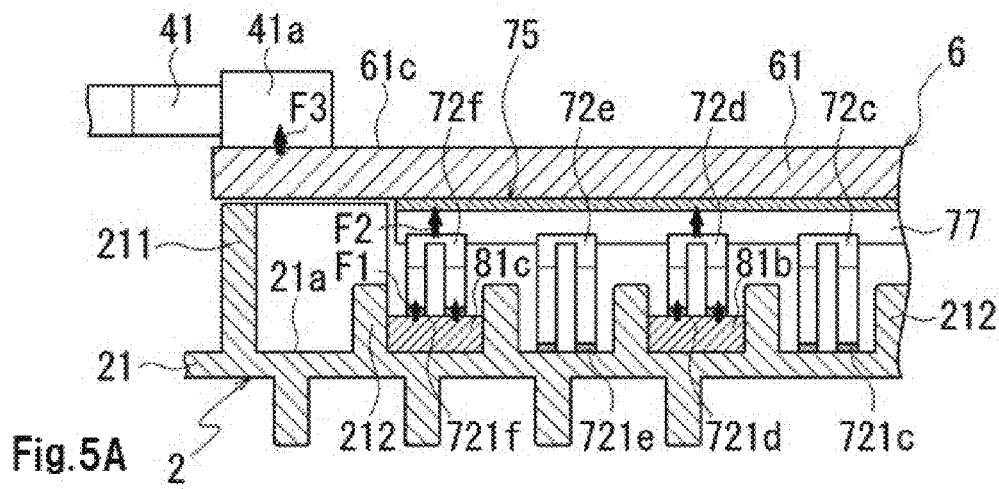
FIGS. 5A and 5B are diagrams explaining the interference portion according to the embodiment.
Figure 5B:
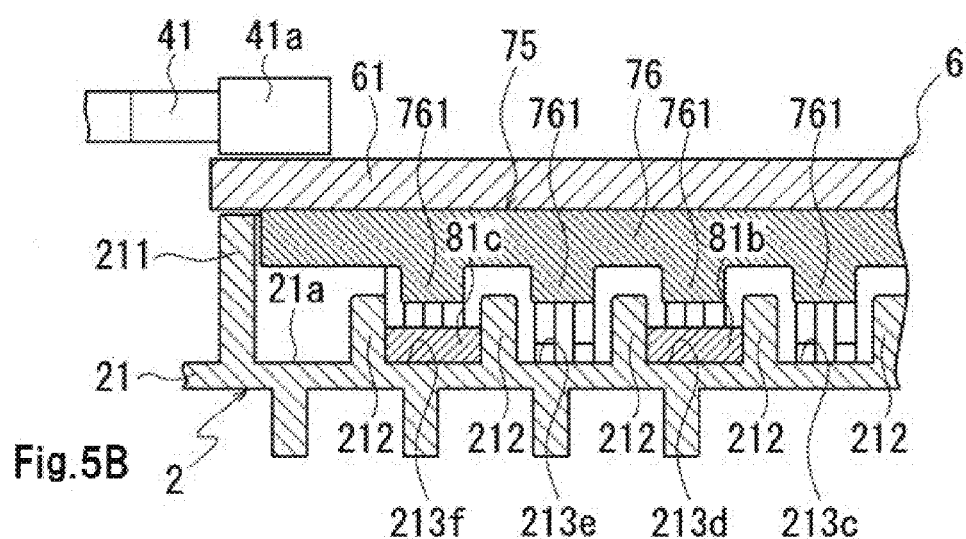

FIGS. 5A and 5B are diagrams explaining the interference portion 8 (swollen portions 81b, 81c) according to the embodiment, wherein FIG. 5A is a diagram explaining a function of the swollen portions 81 (81b, 81c), and FIG. 5B is a diagram explaining an arrangement of the swollen portions 81 (81b, 81c). It should be noted that in FIGS. 5A and 5B, the illustration of the swollen portion 81a is omitted for descriptive purposes.

In the embodiment, as illustrated in FIG. 3C, the plastic swollen portions 81a to 81c formed to swell to the detent plate 6-side by a predetermined height "h" from the surface 21a of the base portion 21 are used as the interference portion 8.

The swollen portion 81 is provided in a region in the left side from the line segment Lm in FIG. 2A (the other side edge 21c-side of the base portion 21) that is on the movement track of the abutting portions 721 (721a to 721f) of the movable contact point 7 when the detent plate 6 rotates around the rotational axis X and outside of the movement range of the abutting portions 721 (721a to 721f) upon detecting the selection range of the shift lever.

The swollen portion 81 has a flat surface 811 in parallel to the surface 21a of the base portion 21, a first inclined surface 812 adjacent to the flat surface 811 in the assembly direction side of the detent plate 6, and a second inclined surface 813 adjacent to the flat surface 811 in the non-assembly direction side of the detent plate 6.

The first inclined surface 812 and the second inclined surface 813 are inclined in a direction in which a height from the base portion 21 is lower as being away from the flat surface 811 in the peripheral direction around the rotational axis X, and an inclined angle θ1 of the first inclined surface 812 to the surface 21a of the base portion 21 is set to an angle greater than an inclined angle θ2 of the second inclined surface 813 to the surface 21a of the base portion 21.

Here, when the detent plate 6 rotates in the non-assembly direction, the movable contact piece 72 of the movable contact point 7 slides to the flat surface 811 on the first inclined surface 812 while elastically deforming the abutting portion 721 in the distal side in a direction of being away from the pole board 2 (upper direction in FIG. 3C).

The stress generated due to the elastic deformation of the movable contact piece 72 is transmitted to the detent plate 6, which acts in a direction of pressing the detent plate 6 on the abutting portion 41 of the support member 4 (refer to arrows F1, F2, F3 in FIG. 5A).

Then, stress F3 acting in the direction of pressing the detent plate 6 on the abutting portion 41 of the support member 4 generates resistance to the rotation of the detent plate 6 around the rotational axis X. As a result, when the detent plate 6 does not receive input of rotational torque greater than the resistance, the detent plate 6 cannot cause the movable contact piece 72 of the movable contact point 7 to go over the swollen portion 81 to rotate in the non-assembly direction.

Here, the resistance against the rotation of the detent plate 6 around the rotational axis X is the greater as the inclined angle θ1 of the first inclined surface 812 is greater.

In the embodiment, in consideration of the rotational torque A acting on the detent plate 6 due to vibrations or the like, the inclined angle θ1 of the first inclined surface 812 is set such that rotational torque B required for causing the movable contact piece 72 of the movable contact point 7 to go over the swollen portion 81 to rotate the detent plate 6 in the non-assembly direction becomes greater than rotational torque A.

Incidentally, when the inclined angle θ1 becomes excessively great, in some cases the movable contact piece 72 is flexed (buckles) while the abutting portion 721 of the movable contact piece 72 goes over the first inclined surface 812 and moves to the flat surface 811. When the movable contact piece 72 is flexed, the abutting portion 721 of the movable contact piece 72 cannot appropriately make contact with the associated fixed contact point 3 upon assembling the detent plate 6 to the pole board 2 again.

In addition, when the inclined angle θ1 is small, it becomes impossible to block the rotation of the detent plate 6 in the non-assembly direction.

Then, there are some cases where upon transporting the inhibiter switch 1 after completion of the assembly, the detent plate 6 rotates in a direction of being removed from the pole board 2 by vibrations at the transporting to be disconnected from the pole board 2. In this case, the abutting portion 721 of the movable contact piece 72 and the like attached on the detent plate 6 are possibly damaged.

Therefore the inventors of the present application have studied the state of the detent plate 6 and the movable contact piece 72 by variously changing the inclined angle θ1. As a result, it has found out that by setting the inclined angle θ1 in a range of 40° C. to 70° C., both prevention of the rotation of the detent plate 6 in the non-assembly direction and prevention of the flexion of the movable contact piece 72 can be performed, and at the same time, even if contact and separation of the abutting portion 721b of the movable contact piece 72 with and from the first inclined surface 812 are repeated by displacement of the abutting portion 721 in the peripheral direction around the rotational axis X due to vibrations at the transporting, it is possible to prevent the abutting portion 721 from being flexed.

Therefore, in the embodiment it is preferable to set the inclined angle θ1 in a range of 40° C. to 70° C.

In addition, when the detent plate 6 rotates in the assembly direction, the movable contact piece 72 of the movable contact point 7 slides to the flat surface 811 on the second inclined surface 813 while elastically deforming the abutting portion 721 in the distal side in a direction of being away from the pole board 2.

Here, in the embodiment the inclined angle θ2 of the second inclined surface 813 is made smaller than the inclined angle θ1 of the first inclined surface 812 to make the rotational torque C required for rotating the detent plate 6 in the assembly direction smaller than the rotational torque B required for rotating the detent plate 6 in the non-assembly direction.

This is because upon rotating the detent plate 6 in the assembly direction, it is necessary to smoothly assemble the detent plate 6 to the pole board 2 by making it possible to cause the abutting portion 721 of the movable contact point 7 to go across the swollen portion 81 from the second inclined surface 813-side to the first inclined surface 812-side without being subjected to large resistance.

When the displacement of the detent plate 6 in the direction of being away from the pole board 2 is completely restricted, all of stresses generated by the elastic deformation of the movable contact piece 72 become the resistance to the rotation of the detent plate 6 around the rotational axis X. However, in a case where the region of the detent plate 6 covering the swollen portion 81 is slightly displaceable in the direction of being away from the pole board 2, the resistance to the rotation of the detent plate 6 around the rotational axis X can be reduced by this displacement amount.

The reduction degree of the resistance is greater when the abutting portion 721 of the movable contact piece 72 in the movable contact point 7 slides on the second inclined surface 813 of the swollen portion 81 than when it slides on the first inclined surface 812.

As a result, the rotational torque C required for rotating the detent plate 6 in the assembly direction can be made smaller upon assembling the detent plate 6 to the pole board 2 provided with the swollen portion 81. Therefore although the swollen portion 81 is provided, workability of a regular assembling work of assembling the detent plate 6 to the pole board 2 is not greatly damaged.

In the embodiment, the swollen portions 81 are provided only in the grooves 213b, 213d, 213f where the fixed contact points 3b, 3d, 3f are positioned, and as the swollen portion 81 is positioned in the outer diameter side, a length W thereof in the peripheral direction around the rotational axis X is the longer.

Here, the inhibiter switch 1 is installed and used inside the unillustrated transmission case, and the inhibiter switch 1 is used under an environment where lubricating oil containing metallic powder and the like (hereinafter, described as foreign substances) in the transmission case regularly act.

Therefore when foreign substances contained in the lubricating oil are stagnant in the grooves 213 (213a to 213f) where the fixed contact points 3 are positioned, the fixed contact points in the grooves 213 (213a to 213f) where the foreign substances are stagnant and the fixed contact points in the adjacent, other grooves 213 (213a to 213f) are possibly short-circuited by the stagnant foreign substances.

As illustrated in FIG. 5B, projections 761 to be inserted in the grooves 213 (213a to 213f) are provided in the extension wall 76 on the support platform 75 supporting the movable contact point 7, and when the detent plate 6 rotates around the rotational axis X, the foreign substances stagnant in the grooves 213 (213a to 213f) are pushed out to an exterior by the projections 761 inserted in the grooves 213 (213a to 213f).

Here, when the swollen portions 81 are provided in all of the grooves 213 (213a to 213 f), push-out of the foreign substance pushed by the projection 761 is possibly blocked. Therefore in the embodiment, at the time of providing the swollen portions in the grooves adjacent to each other in the radial direction of the rotational axis X in the pole board 2, the groove in which the swollen portion 81 is provided and the groove in which the swollen portion 81 is not provided are alternately arranged, which prevents short-circuit by contact between the foreign substance stagnant in the groove and the foreign substance of the other groove adjacent thereto.

Particularly since the fixed contact point 3a of the groove 213a positioned in the innermost diameter side in the pole board 2 is a ground electrode exposed on the surface of the pole board 2, it is possible to more appropriately suppress generation of the short-circuit by not providing the swollen portion 81 in the groove 213a.

As described above, according to the embodiment, (1) The inhibiter switch 1 comprises:

the pole board 2 on the surface 21a of which the fixed contact point 3 is provided;

the detent plate 6 that is rotatably supported by the pole board 2;

the movable contact point 7 that is fixed on an opposing part of the detent plate 6 to the surface 21a and has the movable contact piece 72 (contact piece) with the fixed contact point 3; and the support member 4 (retaining member) that makes contact with the detent plate 6 assembled in the pole board 2 to allow rotation of the detent plate 6 around the rotational shaft and restrict movement of the detent plate 6 in a direction of the rotational shaft X, and retains the detent plate 6 in a state where the movable contact piece 72 of the movable contact point 7 is elastically engaged to the fixed contact point 3, the detent plate 6 being rotated on one side around the rotational shaft X to be assembled in the pole board 2, and the stopper 223 that is provided in the pole board 2 to define a rotation range of the detent plate 6 on the one side, wherein the interference portion 8 is provided on a movement track of the movable contact piece 72 when the detent plate 6 rotates around the rotational shaft X, the interference portion 8 interfering with the movable contact piece 72 to become the resistance to the rotation of the detent plate 6 to the other side around the rotational shaft X.

With this configuration, when the detent plate 6 rotates to the other side around the rotational axis X (in the non-assembly direction) that is the direction of removing the detent plate 6 from the pole board 2, the interference portion 8 provided in the pole board 2 interferences with the movable contact piece 72 of the movable contact point 7 fixed in the detent plate 6 to become the resistance to the rotation of the detent plate 6 in the direction of being removed from the pole board 2.

Therefore, when rotational torque greater than the resistance acting from the interference portion 8 does not act on the detent plate 6, the detent plate 6 rotates to the other side around the rotational axis X and is not disconnected from the pole board 2.

Accordingly, it is possible to prevent the detent plate 6 from being easily disconnected from the pole board 2 of the inhibiter switch 1 after completion of the detent plate assembly.

Further, since the interference portion 8 does not restrict the rotation of the detent plate 6 around the rotational axis X, the interference portion 8 does not greatly block an operation of assembling the detent plate 6 to the pole board 2 and an operation of removing the detent plate assembled in the pole board 2 from the pole board 2.

In addition, in a case where a defect is found out in the inhibiter switch 1 after completion of the assembly, since the detent plate 6 can be removed from the pole board 2 to replace the defective one, it is not necessary to dispose of the detent plate 6 after completion of the assembly as it is.

Therefore the yield ratio improves, and reduction in the number of the disposal components is made possible, thus making it possible to expect reduction in burden of treatment costs of the disposal components. Further, additional production following the disposal does not become necessary.

(2) The interference portion 8 is provided on the movement track of the abutting portion 721 of the movable contact piece 72 and outside of the movement range when the detent plate 6 rotates in the detection range of the inhibiter switch 1 (in the left side from the line segment Lm in FIG. 2A).

With this configuration, since the interference portion 8 is provided outside of the movement range of the abutting portion 721 of the movable contact point 7 moving upon detecting the selection range of the shift lever (unillustrated), it is possible to appropriately prevent the interference portion 8 from being the resistance to the operation of the shift lever.

(3) The interference portion 8 is the swollen portion 81 swelling to the detent plate 6-side from the surface 21a of the pole board 2, the swollen portion 81 has the first inclined surface 812 positioned on one side in the peripheral direction around the rotational axis X (direction side of assembling the detent plate 6 to the pole board 2: assembly direction side) and the second inclined surface 813 positioned on the other side (direction side of removing the detent plate 6 from the pole board 2: non-assembly direction side), and the inclined angle θ1 of the first inclined surface 812 to the surface 21a of the base portion 21 is set to the angle greater than the inclined angle θ2 of the second inclined surface 813 to the surface 21a of the base portion 21.

With this configuration, the resistance acting from the swollen portion 81 when the abutting portion 721 of the movable contact piece 72 passes the swollen portion 81 by rotating the detent plate 6 in the assembly direction side that is the direction of assembling the detent plate 6 to the pole board 2 is made smaller than the resistance acting from the swollen portion 81 when the abutting portion 721 of the movable contact piece 72 passes the swollen portion 81 by rotating the detent plate 6 in the non-assembly direction side that is the direction of removing the detent plate 6 from the pole board 2.

Therefore the assembly work of the detent plate 6 to the pole board 2 is not greatly blocked by the swollen portion 81.

In addition, an operator of performing the assembly work does not have an uncomfortable feeling on the assembly work of the detent plate 6 to the pole board 2 or difficulty in the assembly work.

(4) The fixed contact point 3 (3a to 3f) comprises a plurality of fixed contact points provided in the radial direction of the rotational axis X by predetermined intervals.

The movable contact point 7 has a plurality of movable contact pieces 72 (72a to 72f) corresponding to the fixed contact points (3a to 3f) on a one-to-one basis, and the interference portion 8 (swollen portion 81) is provided on at least one movement track of the respective movement tracks of the abutting portions 721 of the movable contact pieces 72 when the detent plate 6 rotates around the rotational axis X.

With this configuration, the resistance acting on the detent plate 6 can be adjusted to an appropriate dimension by adjusting the number of the interference portions 8 (swollen portions 81).

(5) The partition walls 212 (layout wall) are provided on both the sides of the fixed contact points 3 (3a to 3f) in the radial direction of the rotational axis X to lay out an area in which the fixed contact point 3 is provided and an area in which the other fixed contact point 3 adjacent thereto is provided, and the abutting portions 721 of the movable contact pieces 72 are respectively arranged in the grooves 213 (213a to 213f) between the partition walls 212.

With this configuration, the abutting portions 721 of the movable contact pieces 72 can securely make contact with the associated fixed contact points 3 (3a to 3f) respectively.

In the transmission case, the inhibiter switch 1 is provided in the position on which the lubricating oil containing foreign substances (metallic powder or the like) acts, and on the pole board 2, the fixed contact points 3 (3b, 3d, 3f) in which the interference portion 8 (swollen portion 81) is provided on the movement track of the abutting portion 721 of the movable contact piece 72 and the fixed contact points 3 (3a, 3c, 3e) in which the interference portion 8 (swollen portion 81) is not provided thereon are alternately provided in the radial direction of the rotational axis X.

In the grooves 213 (213b, 213d, 213f) where the interference portions 8 (swollen portions 81) are provided among the grooves 213 (213a to 213f) where the fixed contact points 3 (3a to 3f) are provided, discharge of the entered lubricating oil to an exterior of the groove 213 is possibly blocked by the interference portion 8 (swollen portion 81).

Then, the foreign substances contained in the lubricating oil tend to be easily stagnant inside the grooves 213, and when the stagnation of the foreign substances is generated in both of the two grooves 213 adjacent in the radial direction, in some cases the fixed contact points 3 in the grooves 213 adjacent in the radial direction are short-circuited by contact between the stagnant foreign substance and the foreign substance stagnant in the other groove 213.

With this configuration, since the grooves 213 (213b, 213d, 213f) in which the interference portions 8 (swollen portions 81) are provided and the grooves 213 (213a, 213c, 213e) in which the interference portions 8 (swollen portions 81) are not provided are positioned alternately in the radial direction, the generation of the short-circuit can be made less than in a case where the interference portion 8 is provided in each of the adjacent grooves 213 (213a to 213f).

(7) In the plurality of fixed contact points 3 (3a to 3f) provided in the pole board 2, the fixed contact point 3a positioned in the innermost diameter side in the radial direction of the rotational axis X is a ground contact point exposed on the surface 21a of the pole board 2 over an entire length of the peripheral direction around the rotational axis X, the other fixed contact points 3 (3b to 3f) are contact points each having a part in the peripheral direction around the rotational axis X that is exposed on the surface 21a of the pole board 2, and the interference portions 8 (swollen portions 81) are provided on the movement tracks of the other fixed contact points 3 (3b to 3f).

With this configuration, since the foreign substance is less likely to be stagnant in the groove in which the ground contact point is provided, it is possible to reduce the possibility that the short-circuit is generated.

The above-mentioned embodiment has exemplified a case where the swollen portion 81 swollen in the detent plate 6-side from the surface 21a of the base portion 21 in the pole board 2 is adopted as the interference portion 8, but the interference portion 8 is not limited to this example.

Figure 6:
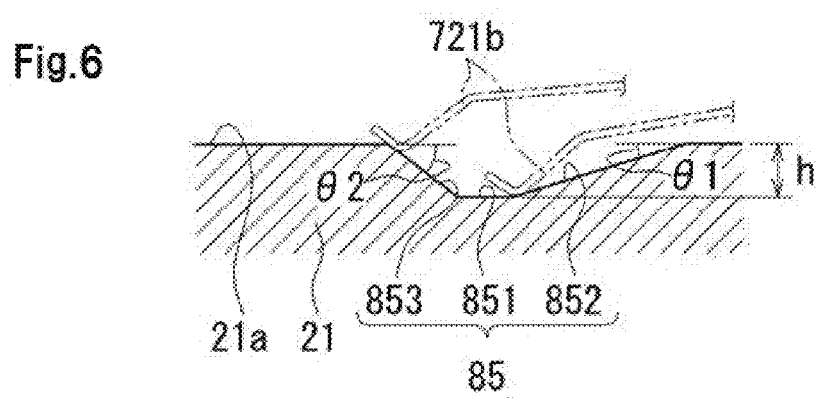
FIG. 6 is a diagram explaining an interference portion according to a modification of the embodiment.

For example, as illustrated in FIG. 6, a concave groove portion 85 recessed in the inside of the base portion 21 from the surface 21a of the base portion 21 may be adopted as the interference portion 8.

The concave groove portion 85 includes a flat surface 851 in parallel to the surface 21a of the base portion 21, a first inclined surface 852 adjacent to the flat surface 851 in the assembly direction side of the detent plate 6, and a second inclined surface 853 adjacent thereto in the non-assembly direction side of the detent plate 6.

In the peripheral direction around the rotational axis X, the first inclined surface 852 and the second inclined surface 853 each are inclined in a direction where a depth thereof from the surface 21a of the base portion 21 is the shallower as being away from the flat surface 851, and an inclined angle $\theta 1$ of the inclined surface 852 to the surface 21a of the base portion 21 is set to be smaller than an inclined angle $\theta 2$ of the second inclined surface 853 to the surface 21a of the base portion 21.

With this configuration, when the detent plate 6 rotates in the non-assembly direction, the movable contact piece 72 of the movable contact point 7 slides on the second inclined surface 853 in a direction of being away from of the flat surface 851 while elastically deforming the abutting portion 721 in the distal side in a direction of being away from the pole board 2 (in the upper direction in FIG. 6). Therefore at this moment, the stress generated by the elastic deformation of the movable contact piece 72 becomes the resistance to the rotation of the detent plate 6 in the non-assembly direction.

In this modification also, in consideration of the rotational torque A acting on the detent plate 6 due to vibrations or the like, the inclined angle $\theta 2$ of the second inclined surface 853 is set such that the rotational torque B required for causing the movable contact piece 72 of the movable contact point 7 to go over the second inclined surface 853 and rotating the detent plate 6 in the non-assembly direction is greater than the rotational torque A.

In addition, when the detent plate 6 rotates in the assembly direction, the movable contact piece 72 of the movable contact point 7 slides on the concave groove portion 85 recessed from the surface 21a of the base portion 21.

On this occasion, the pushing force acting on the detent plate 6 from the movable contact point 7 is reduced by the depth of the concave groove portion 85 and the resistance upon rotating the detent plate 6 in the assembly direction becomes small. Therefore the assembly of the detent plate 6 to the pole board 2 is smoothly performed without being subjected to the resistance.

In this way, in the inhibiter switch 1 according to the modification, (8) the interference portion 8 is the concave groove portion 85 recessed in the inside of the base portion 21 in the pole board 2 from the surface 21a of the pole board 2, the concave groove portion 88 has the first inclined surface 852 positioned on one side in the peripheral direction around the rotational axis X (direction side of assembling the detent plate 6 to the pole board 2: assembly direction side) and the second inclined surface 853 positioned on the other side (direction side of removing the detent plate 6 from the pole board 2: non-assembly direction side), and the inclined angle $\theta 1$ of the first inclined surface 852 to the surface 21a of the base portion 21 is set to the angle smaller than the inclined angle $\theta 2$ of the second inclined surface 853 to the surface 21a of the base portion 21.

With this configuration also, it is possible to prevent the detent plate 6 from being easily disconnected from the pole board 2 in the inhibiter switch 1 in which the assembly of the detent plate 6 is completed.

In addition, an operator of performing the assembly work does not have an uncomfortable feeling on the assembly work of the detent plate 6 to the pole board 2 or difficulty in the assembly work.

While only the selected embodiment has been chosen to illustrate the present invention, it will be apparent to those skilled in the art from this disclosure that various changes and modifications can be made therein without departing from the scope of the invention as defined in the appended claims. Furthermore, the foregoing description of the embodiment according to the present invention is provided for illustration only, and not for the purpose of limiting the invention as defined by the appended claims and their equivalents.

What is claimed is:

1. An inhibiter switch comprising:
a pole board on a surface of which a fixed contact point is provided;
a detent plate that is rotatably supported on the pole board;
a movable contact point that is fixed on an opposing part of the detent plate to the surface and includes a contact piece with the fixed contact point;
a retaining member that makes contact with the detent plate assembled in the pole board to allow rotation of the detent plate around a rotational shaft and restrict movement of the detent plate in a direction of the rotational shaft, and retains the detent plate in a state where the contact piece is elastically engaged to the fixed contact point, the detent plate being rotated in one side around the rotational shaft to be assembled in the pole board; and
a stopper that is provided in the pole board to define a rotation range of the detent plate in the one side, wherein
an interference portion is provided on a movement track of the contact piece when the detent plate rotates around the rotational shaft, the interference portion interfering with the movable contact piece to become resistant to the rotation of the detent plate to another side around the rotational shaft.

2. The inhibiter switch according to claim 1, wherein:
the interference portion is provided on the movement track and outside of a movement range when the detent plate rotates in a detection range of the inhibiter switch.

3. The inhibiter switch according to claim 2, wherein:
the interference portion includes a swollen portion swelling to the detent plate side from the surface of the pole board,
the swollen portion has a first inclined surface positioned on the one side in the peripheral direction around the rotational axis defined by the rotational shaft and a second inclined surface positioned on the another side, and
an inclined angle of the first inclined surface to the surface is set to an angle greater than an inclined angle of the second inclined surface to the surface.

4. The inhibiter switch according to claim 2, wherein:
the interference portion includes a concave groove portion recessed in the inside portion of the pole board from the surface of the pole board,
the concave groove portion has a first inclined surface positioned on the one side in the peripheral direction around the rotational axis defined by the rotational shaft and a second inclined surface positioned on the another side, and
an inclined angle of the first inclined surface to the surface is set to an angle smaller than an inclined angle of the second inclined surface to the surface.

5. The inhibiter switch according to claim 1, wherein:
the interference portion includes a swollen portion swelling to the detent plate side from the surface of the pole board,
the swollen portion has a first inclined surface positioned on the one side in the peripheral direction around the rotational axis defined by the rotational shaft and a second inclined surface positioned on the another side, and
an inclined angle of the first inclined surface to the surface is set to an angle greater than an inclined angle of the second inclined surface to the surface.

6. The inhibiter switch according to claim 5, wherein:
the fixed contact point comprises a plurality of fixed contact points provided in the radial direction of the rotational axis by predetermined intervals,
the movable contact point comprises a plurality of abutting pieces corresponding to the fixed contact points on a one-to-one basis, and
the interference portion is provided on at least one movement track of the respective movement tracks of the movable contact pieces when the detent plate rotates around the rotational axis.

7. The inhibiter switch according to claim 6, wherein:
partition walls are provided on both the sides of the fixed contact points in the radial direction of the rotational axis to lay out an area in which the fixed contact point is provided and an area in which the other fixed contact point adjacent in the radial direction is provided, and each of the contact pieces is arranged in the groove between the partition walls.

8. The inhibiter switch according to claim 7, wherein:
the inhibiter switch is provided in a position on which lubricating oil containing foreign substances acts, and
on the pole board, the fixed contact point in which the interference portion is provided on the movement track and the fixed contact point in which the interference portion is not provided are alternately provided in the radial direction.

9. The inhibiter switch according to claim 7, wherein:
in the plurality of fixed contact points provided in the pole board, the fixed contact point positioned in the innermost diameter side in the radial direction of the rotational axis includes a ground contact point exposed on the surface of the pole board over an entire length of the peripheral direction around the rotational axis and the other fixed contact point includes a contact point having a part in the peripheral direction around the rotational axis that is exposed on the surface of the pole board, and
the interference portion is provided on the movement track of the other fixed contact point.

10. The inhibiter switch according to claim 1, wherein:
the interference portion includes a concave groove portion recessed in an inside portion of the pole board from the surface of the pole board,
the concave groove portion has a first inclined surface positioned on the one side in the peripheral direction around the rotational axis defined by the rotational shaft and a second inclined surface positioned on the another side, and
an inclined angle of the first inclined surface to the surface is set to an angle smaller than an inclined angle of the second inclined surface to the surface.

11. The inhibiter switch according to claim 10, wherein:
the fixed contact point comprises a plurality of fixed contact points provided in the radial direction of the rotational axis by predetermined intervals,
the movable contact point comprises a plurality of abutting pieces corresponding to the fixed contact points on a one-to-one basis, and
the interference portion is provided on at least one movement track of the respective movement tracks of the movable contact pieces when the detent plate rotates around the rotational axis.

12. The inhibiter switch according to claim 11, wherein:
partition walls are provided on both the sides of the fixed contact points in the radial direction of the rotational axis to lay out an area in which the fixed contact point is provided and an area in which the other fixed contact point adjacent in the radial direction is provided, and each of the contact pieces is arranged in the groove between the partition walls.

13. The inhibiter switch according to claim 12, wherein:
the inhibiter switch is provided in a position on which lubricating oil containing foreign substances acts, and
on the pole board, the fixed contact point in which the interference portion is provided on the movement track and the fixed contact point in which the interference portion is not provided are alternately provided in the radial direction.

14. The inhibiter switch according to claim 12, wherein:
in the plurality of fixed contact points provided in the pole board, the fixed contact point positioned in the innermost diameter side in the radial direction of the rotational axis includes a ground contact point exposed on the surface of the pole board over an entire length of the peripheral direction around the rotational axis and the other fixed contact point includes a contact point having a part in the peripheral direction around the rotational axis that is exposed on the surface of the pole board, and
the interference portion is provided on the movement track of the other fixed contact point.

15. The inhibiter switch according to claim 13, wherein:
in the plurality of fixed contact points provided in the pole board, the fixed contact point positioned in the innermost diameter side in the radial direction of the rotational axis includes a ground contact point exposed on the surface of the pole board over an entire length of the peripheral direction around the rotational axis and the other fixed contact point includes a contact point having a part in the peripheral direction around the rotational axis that is exposed on the surface of the pole board, and
the interference portion is provided on the movement track of the other fixed contact point.

16. The inhibiter switch according to claim 1, wherein:
the fixed contact point comprises a plurality of fixed contact points provided in the radial direction of the rotational axis defined by the rotational shaft by predetermined intervals,
the movable contact point comprises a plurality of abutting pieces corresponding to the fixed contact points on a one-to-one basis, and
the interference portion is provided on at least one movement track of the respective movement tracks of the movable contact pieces when the detent plate rotates around the rotational axis.

17. The inhibiter switch according to claim 16, wherein:
partition walls are provided on both the sides of the fixed contact points in the radial direction of the rotational axis to lay out an area in which the fixed contact point is provided and an area in which the other fixed contact point adjacent in the radial direction is provided, and each of the contact pieces is arranged in the groove between the partition walls.

18. The inhibiter switch according to claim 17, wherein:
in the plurality of fixed contact points provided in the pole board, the fixed contact point positioned in the innermost diameter side in the radial direction of the rotational axis includes a ground contact point exposed on the surface of the pole board over an entire length of the peripheral direction around the rotational axis and the other fixed contact point includes a contact point having a part in the peripheral direction around the rotational axis that is exposed on the surface of the pole board, and
the interference portion is provided on the movement track of the other fixed contact point.

19. The inhibiter switch according to claim 17, wherein:
the inhibiter switch is provided in a position on which lubricating oil containing foreign substances acts, and
on the pole board, the fixed contact point in which the interference portion is provided on the movement track and the fixed contact point in which the interference portion is not provided are alternately provided in the radial direction.

20. The inhibiter switch according to claim 19, wherein:
in the plurality of fixed contact points provided in the pole board, the fixed contact point positioned in the innermost diameter side in the radial direction of the rotational axis includes a ground contact point exposed on the surface of the pole board over an entire length of the peripheral direction around the rotational axis defined by the rotational shaft and the other fixed contact point includes a contact point having a part in the peripheral direction around the rotational axis that is exposed on the surface of the pole board, and
the interference portion is provided on the movement track of the other fixed contact point.

* * * * *